United States Patent
Rodrigues

(10) Patent No.: US 11,767,727 B2
(45) Date of Patent: Sep. 26, 2023

(54) MANDREL MULTIPLYING DEVICE FOR SUBSEA OIL PRODUCTION APPARATUS

(71) Applicant: PETROLEO BRASILEIRO S.A. - PETROBRAS, Rio de Janeiro (BR)

(72) Inventor: Roberto Rodrigues, Rio de Janeiro (BR)

(73) Assignee: PETROLEO BRASILEIRO S.A. - PETROBRAS, Rio de Janeiro (BR)

( * ) Notice: Subject to any disclaimer, the term of this patent is extended or adjusted under 35 U.S.C. 154(b) by 0 days.

(21) Appl. No.: 17/274,688

(22) PCT Filed: Sep. 9, 2019

(86) PCT No.: PCT/BR2019/050382
§ 371 (c)(1),
(2) Date: Mar. 9, 2021

(87) PCT Pub. No.: WO2020/051658
PCT Pub. Date: Mar. 19, 2020

(65) Prior Publication Data
US 2021/0254424 A1    Aug. 19, 2021

(30) Foreign Application Priority Data

Sep. 11, 2018 (BR) .......................... 102018068313-6

(51) Int. Cl.
*E21B 33/038* (2006.01)
*E21B 43/013* (2006.01)
(Continued)

(52) U.S. Cl.
CPC .......... *E21B 33/038* (2013.01); *E21B 43/013* (2013.01); *E21B 43/017* (2013.01); *F16L 37/00* (2013.01)

(58) Field of Classification Search
CPC .... E21B 33/038; E21B 43/013; E21B 43/017; E21B 43/0122; F16L 37/00
See application file for complete search history.

(56) References Cited

U.S. PATENT DOCUMENTS 3,139,932 A * 7/1964 Johnson .................. E21B 23/12
15/104.062
3,599,711 A * 8/1971 Fowler .................... E21B 23/12
166/75.11
(Continued)

FOREIGN PATENT DOCUMENTS

WO    2011037478 A1    3/2011
WO    2011137053 A1    11/2011

*Primary Examiner* — James G Sayre
(74) *Attorney, Agent, or Firm* — RAPHAEL BELLUM PLLC

(57) ABSTRACT

The invention relates to systems for producing oil and hydrocarbons in general, in deep water, using subsea wells and apparatus which are interconnected in a drainage and production system. In this context, the invention relates to a mandrel multiplying device (1a, 1b, 1c, 1d, 1e, 1f) suitable for providing additional points between pieces of subsea apparatus, the device comprising a connector (2) for coupling to a mandrel of a subsea apparatus (8, 9), and at least two mandrels (3, 4, 5) suitable for providing points for connection to subsea lines (J1, J1', J1", J2, R1, R2, A1, A2, A3) which are connected to other pieces of subsea apparatus (8, 9) or to a production unit (13).

16 Claims, 7 Drawing Sheets

(51) Int. Cl.
*E21B 43/017* (2006.01)
*F16L 37/00* (2006.01)

(56) References Cited

U.S. PATENT DOCUMENTS

| | | | | |
|---|---|---|---|---|
| 4,130,161 | A | * | 12/1978 | Jones ............... E21B 33/076 166/368 |
| 4,224,986 | A | * | 9/1980 | Rothberg ............ E21B 23/12 166/117.5 |
| 7,422,066 | B2 | | 9/2008 | Rodrigues |
| 9,695,665 | B2 | | 7/2017 | Older |
| 9,784,074 | B1 | | 10/2017 | Hellums |
| 2002/0100591 | A1 | * | 8/2002 | Barnett ............. E21B 33/038 166/359 |
| 2006/0108120 | A1 | | 5/2006 | Saucier |
| 2007/0227740 | A1 | | 10/2007 | Fontenette |
| 2012/0305260 | A1 | * | 12/2012 | Paturu ............... E21B 33/127 166/357 |
| 2017/0350210 | A1 | * | 12/2017 | Lugo ............... E21B 43/0122 |

* cited by examiner

MANDREL MULTIPLYING DEVICE FOR SUBSEA OIL PRODUCTION APPARATUS

FIELD OF THE INVENTION

This invention is in the field of systems for producing oil and hydrocarbons in general, in deep water, using subsea wells and equipment that are interconnected in a drainage and production system.

BACKGROUND OF THE INVENTION

To increase or enable offshore oil production, principally in deep water, various systems and equipment have been developed and used, which may be installed on the sea floor in various positions, between the wellhead up to the foot of the riser. For example, a Wet Christmas Tree (WCT), a Production Adapter Base (PAB), a Subsea Pump System (SPS), PLET (Pipeline End Termination), PLEM (Pipeline End Manifold), manifolds, subsea lines, etc.

The oil production obtained from each subsea well flows individually or in combination with the production from other wells through subsea pipes and risers to a production unit, such as an FPSO (floating production storage offloading), for example.

Some oil fields present a wide variation between the Productivity Index (PI) values of each well, thus constituting one of the uncertainties that complicate the design of production drainage systems. Some projects in large fields, such as pre-salt, for example, presented higher-than-expected PI, which led to a reduction in the number of wells initially projected to be connected to the production unit. The opposite has also occurred in other projects, where in some cases production ended up being below the processing capacity of the production unit.

Some oil accumulations in the ocean, those said to be marginal, have recoverable volumes that are close to the viability limits, and which in production terms are economically attractive. These limits are dynamic over time, with great sensitivity to variations in: (a) commodities prices for oil, (b) available technologies, (c) costs of equipment and services related to offshore exploration and production.

Many oil fields have already reached, or are about to reach, the end of the useful life of their production equipment and systems, and their remaining reserves are insufficient to justify replacement of the installed production system.

Therefore, developing new concepts and types of production systems that are more flexible, that reduce the costs of construction and operation, is fundamental to revitalizing and developing marginal offshore oil fields.

The layout design of a production system is based on production index values that are estimated for producing wells. As a subsea field enters into production, the real values of the productivity indices for each well become known, there being a variance in relation to the average estimated value used in the design bases of the drainage system. With the passage of time, and with the help of a seismic 4D system, it is possible to see the evolution and production variances in each area of the reservoir, as well as the advance of the water and action of an aquifer. The results may diverge from what was initially planned and projected. Therefore, corrective measures implemented as early as possible may be advantageous, which might require the drilling and connection of new wells to enlarge the system of production wells.

Traditionally in production units limited by the number of risers of interconnected satellite wells, the addition of a new producing well requires that an existing, low-producing well be disconnected. Therefore, a well is usually not disconnected until its oil flow is low. This delays the addition of new wells with better productivity, because in these cases it will be necessary to disconnect and probably abandon a lower-producing well. Once disconnected, a well is usually never reconnected, due to the operating costs required to reconnect a subsea well.

Therefore it is desirable to use subsea assemblies that facilitate the addition of new wells, and hibernation of less-productive existing wells, with the possibility of producing again in the future without requiring a subsea reconnection of pipes.

To do this, the addition of extra mandrels (reserves) is recommended in subsea equipment, such as: subsea pump systems (SPS), the base of subsea processing systems (for example: separation), manifold, and at the base of the Production Adapter Base (PAB); in order to make extra points available to connect new wells, without having to disconnect from existing wells or from new risers. This layout allows a better balance between the number of producing wells and the capacity of Stationary Production Units (SPU).

Initially, the riser would be shared in the capacity of the new well producing, with the old well closed, which may return to production in the future since it remains connected. Under certain conditions it is possible to have the two wells producing simultaneously.

Placing extra mandrels on subsea equipment requires a change in the current manufacturing standard, principally Wet Christmas Trees, with the use of this resource limited only to new equipment to be acquired in the future. The majority of subsea equipment is already manufactured and installed, and even in the new fields the indiscriminate acquisition of subsea equipment with extra mandrels can impact prices and periods.

Therefore, in the current state of the art there are still scenarios to develop and use solutions that mitigate such limitations, making it possible to connect new wells to the existing drainage system in subsea oil fields, with the smallest impact possible.

As will be better detailed below, this invention seeks to resolve the problem in the state of the art described above in a practical and efficient manner.

SUMMARY OF THE INVENTION

The principal objective of this invention is to provide a mandrel multiplying device that is capable of converting a mandrel on any existing subsea equipment, already installed or awaiting installation, into two (or more) new mandrels, providing one (or more) extra interconnection points in the subsea drainage system.

In order to attain the objective described above, this invention provides a mandrel multiplying device for subsea oil production equipment, adapted to provide additional points between subsea equipment, comprising a connector for coupling with a mandrel of a subsea apparatus and at least two mandrels adapted to provide points of connection with subsea pipes interconnected to other subsea equipment or to a production unit.

BRIEF DESCRIPTION OF THE FIGURES

The detailed description presented below references the annexed figures and their respective reference numbers.

DETAILED DESCRIPTION OF THE INVENTION

First, it is noted that the following description will begin with a preferred embodiment of the invention. As will become evident to any expert in the matter, however, the invention is not limited to that particular embodiment.

FIGS. 1a to 1f show schematic views of several possible embodiments of the device according to this invention. FIG. 2, in turn, shows a schematic view of a WCT 9 comprising two devices according to this invention. In both embodiments, the device of this invention comprises a connector 2 for coupling with a subsea equipment mandrel, which, in the embodiment illustrated in FIG. 2, consists of a WCT 9.

Additionally, as shown in FIGS. 1a to 1f, the device of this invention will comprise at least two mandrels 3, 4, 5 adapted to provide connection points with subsea pipes interconnected to other subsea equipment or to a production unit.

In the embodiment shown in FIG. 2, the main valves of a WCT are also shown 9, to wit, production master M1, annular master M2, production wing W1, annular wing W2, production swab S1, annular swab S2, cross over XO, and pig cross over PXO.

Figure 3:
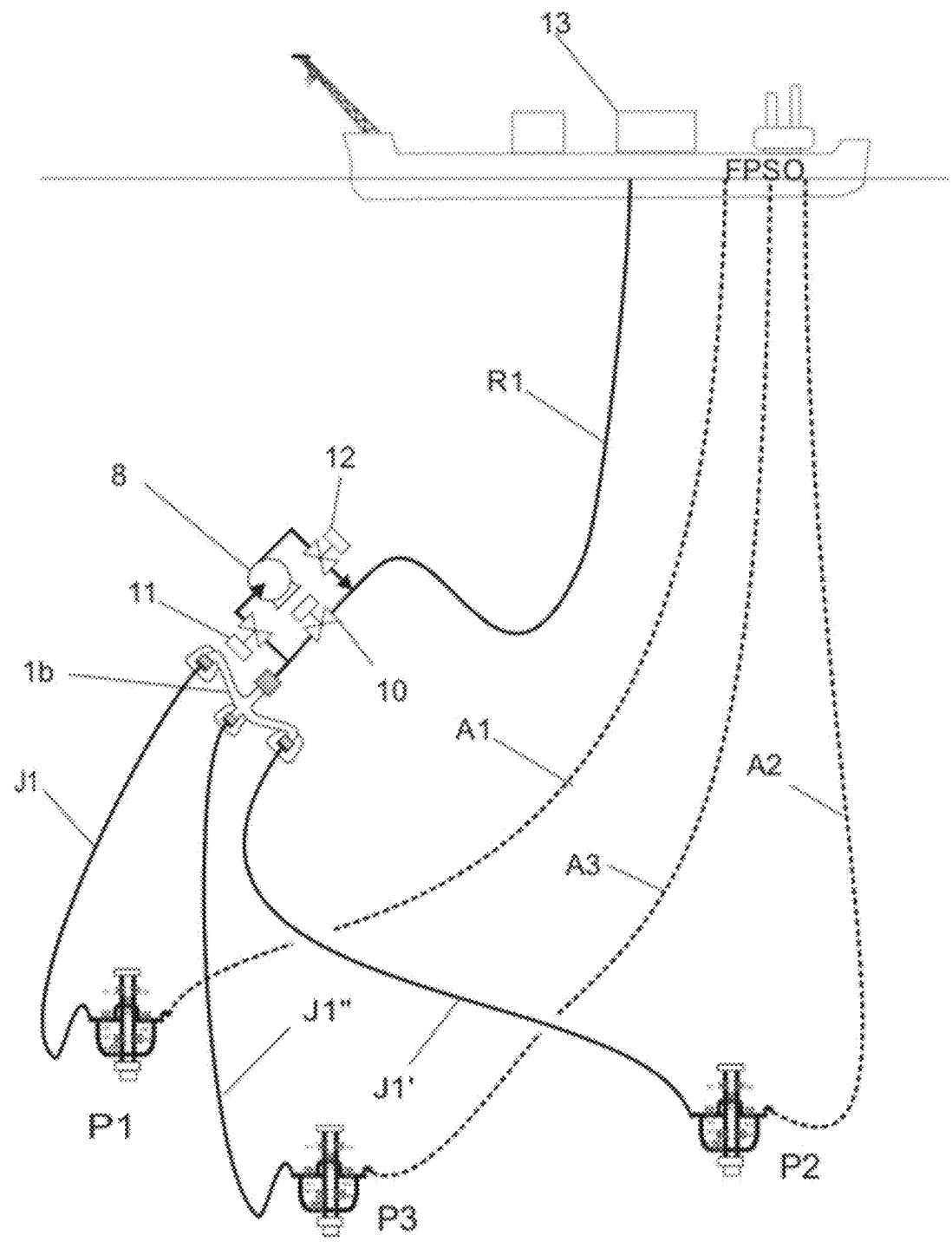
FIG. 3 shows a schematic view of an SPS, originally with just one suction mandrel, interconnected to three wells through the device of this invention.

FIG. 3 shows an example of a subsea layout that might benefit from the device of this invention. In this example, the device's connector 1b according to one of the embodiments of this invention, is connected to the entry mandrel of an SPS 8. The three mandrels 3, 4, 5 of the device 1b of this invention are connected to three production wells P1, P2, P3 through three production jumpers J1, J1, J1". The exit mandrel from the SPS 8 is connected to a single riser R1 to send the production flow to an FPSO 13.

Since the geometry of the mandrel multiplier 1b is designed to allow passage of a pig, it is possible to send a pig through any one of risers A1, A2, A3 to the SPS 8, returning through the production riser R1 to the production unit 13. The following elements are also illustrated in FIG. 3: bypass valve 10, suction valve 11, discharge valve 12.

Again referencing FIGS. 1a to 1f, the device according to this invention, optionally comprises at least one interface for a maneuvering and installation tool 7. The mentioned interface may be any type of interface known in the state of the art.

Also optionally, the device of this invention may comprise at least one guide funnel 6 positioned around each mandrel 3, 4, 5. These funnels 6 guide the connection of the subsea pipes to the mentioned mandrels 3, 4, 5.

Optionally, the device of this invention is designed with geometry to allow passage of a pig between its connection points. According to the embodiment shown in FIG. 1a, the device 1a of this invention, due to its peculiar radius of curvature, allows a pig to pass between mandrel 3 and mandrel 4.

Figure 1A:
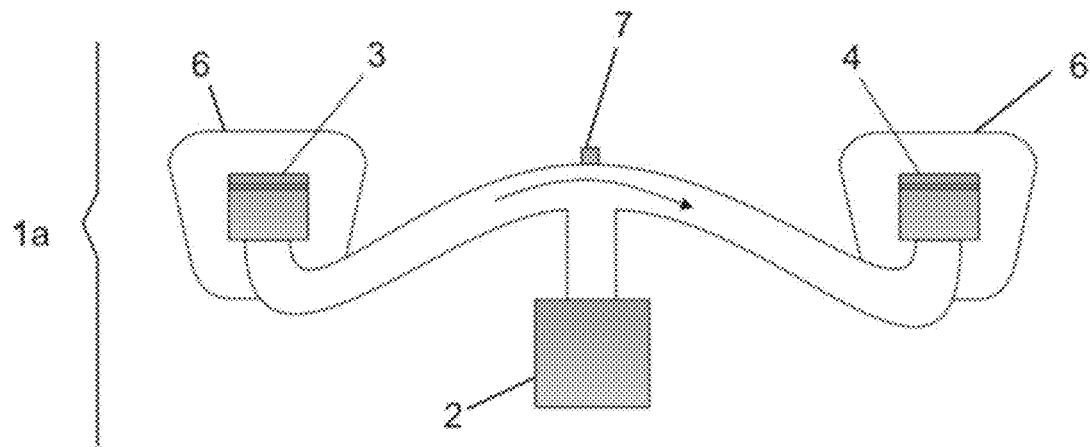
FIGS. 1a to 1f show schematic views of several possible embodiments of the device according to this invention.
Figure 1B:
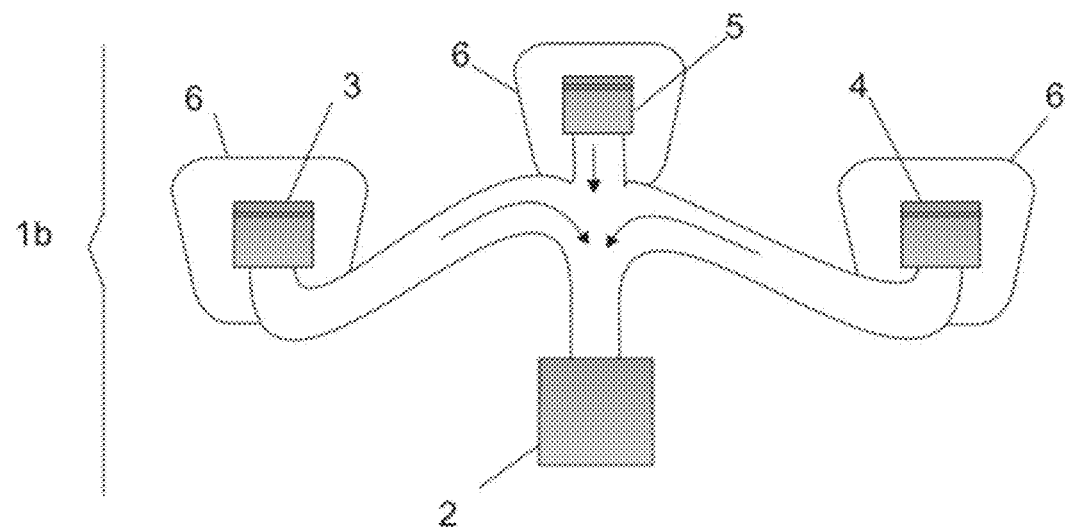
Figure 2:
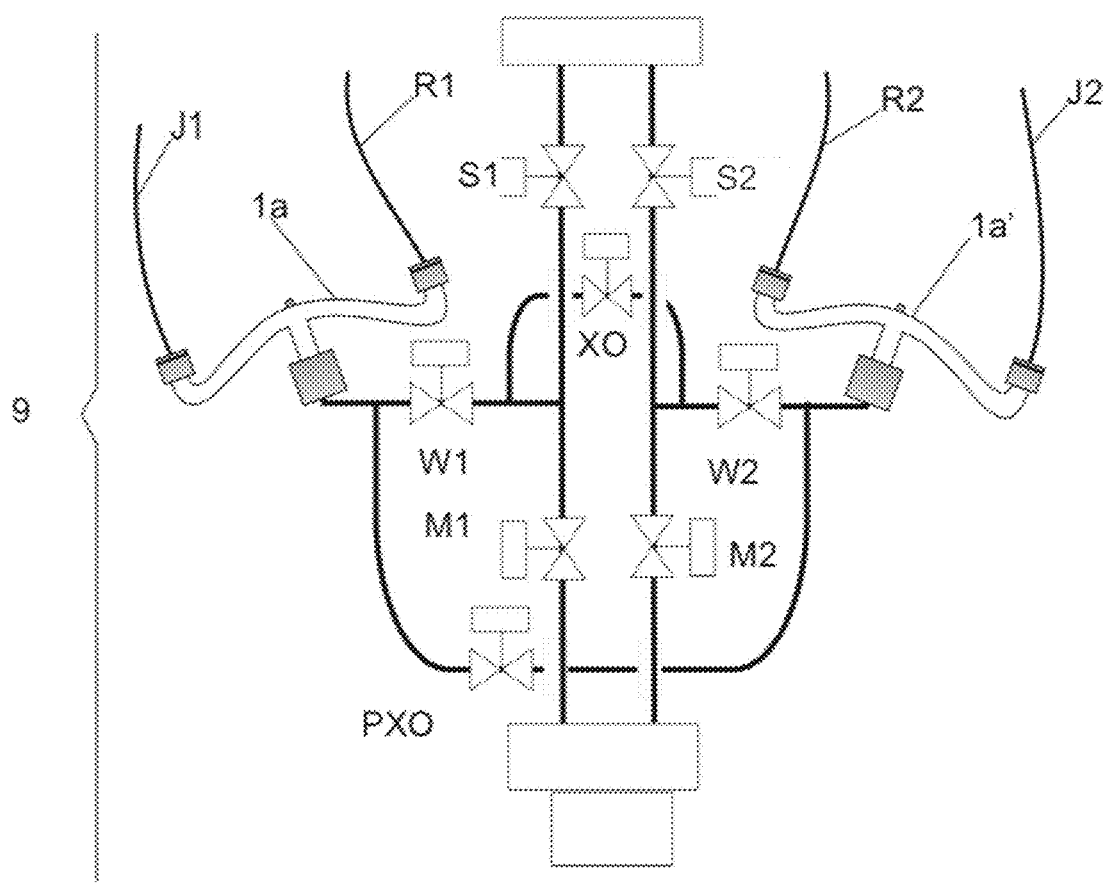
FIG. 2 shows a schematic view of a WCT comprising two devices in accordance with one of the possible embodiments of this invention.

In the embodiment shown in FIG. 1b, the device 1b of this invention is designed with geometry to allow the pig to pass between the mandrel 3 and the connector 2, between the mandrel 4 and the connector 2, and also between the mandrel 5 and the connector 2.

Figure 1C:
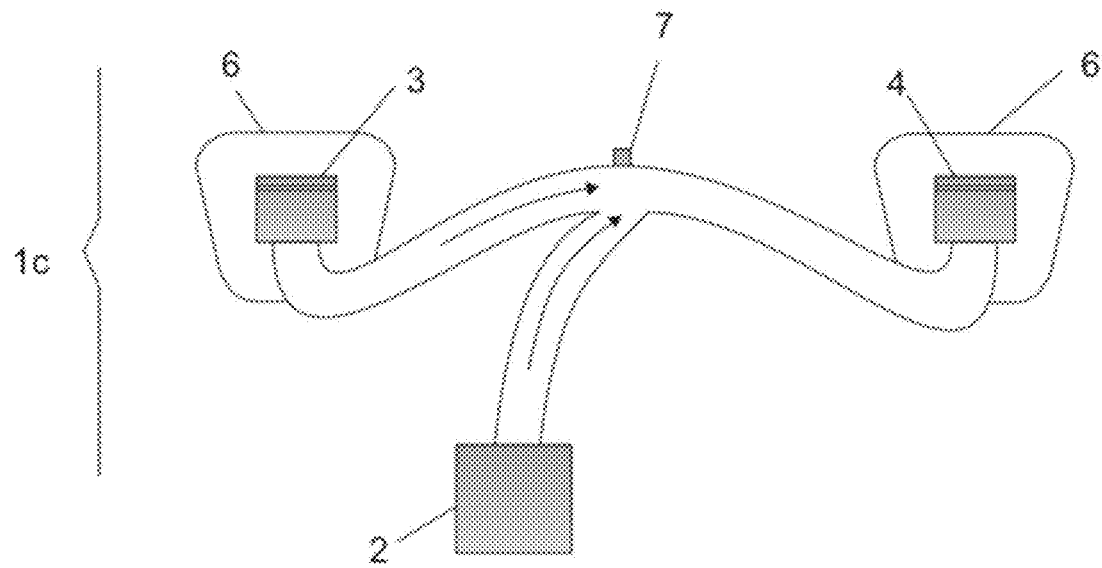

In the embodiment shown in FIG. 1c, the device 1c of this invention is designed with geometry to allow the pig to pass between the mandrel 3 and the mandrel 4, and also between the connector 2 and the mandrel 4.

Figure 1D:
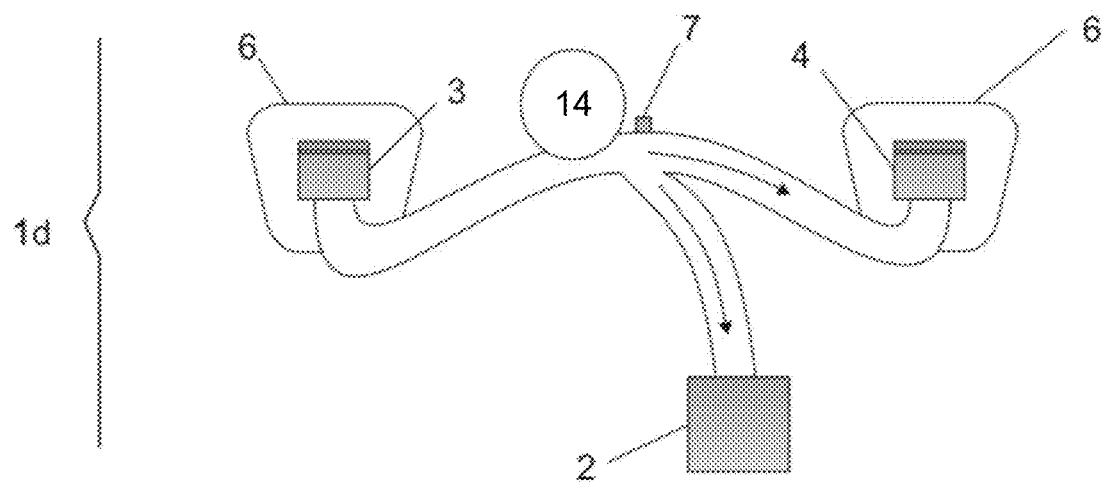

In the embodiment shown in FIG. 1d, the device 1d of this invention is designed with geometry to allow the pig to pass between the mandrel 3 and the mandrel 4, and also between the mandrel 3 and the connector 2. In that embodiment, the device 1d preferably comprises a pig diverter 14, which allows pre-selecting passage of a pig between the mandrel 3 and the mandrel 4, or between the connector 2 and the mandrel 4.

Figure 1E:
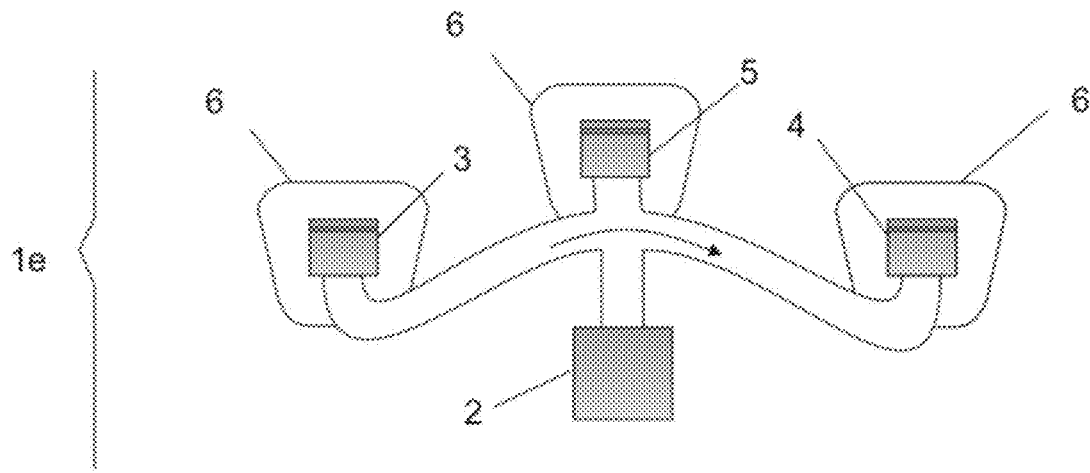

In the embodiment shown in FIG. 1e, the device 1e of this invention is designed with geometry to allow the pig to pass between the mandrel 3 and the mandrel 4, and also between the mandrel 5 and the connector 2.

Figure 1F:
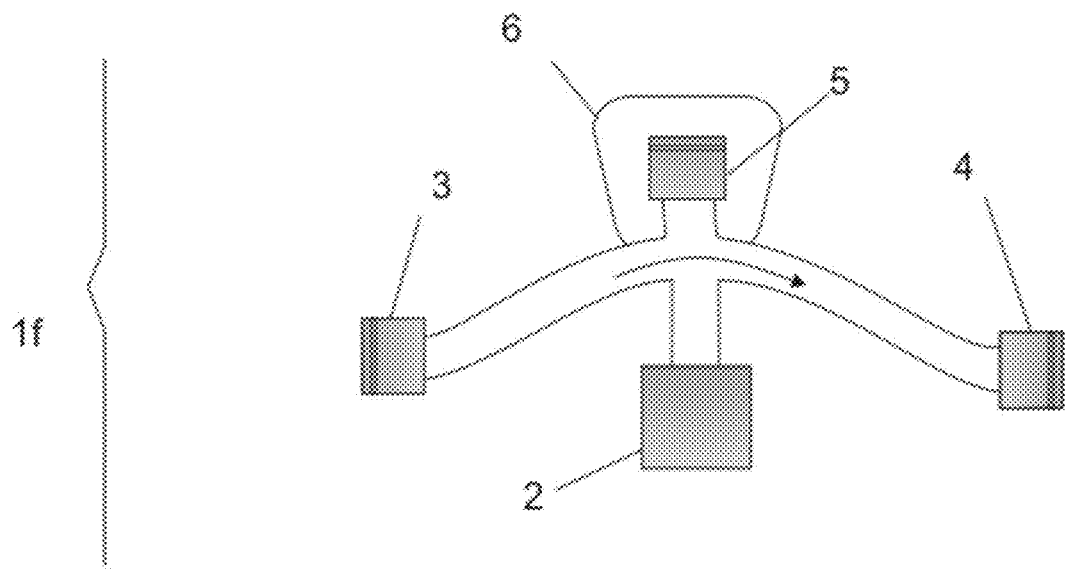

In the embodiment shown in FIG. 1f, the device 1f of this invention comprises two mandrels 3, 4 positioned horizontally, and a third mandrel 5 positioned vertically.

Figure 4:
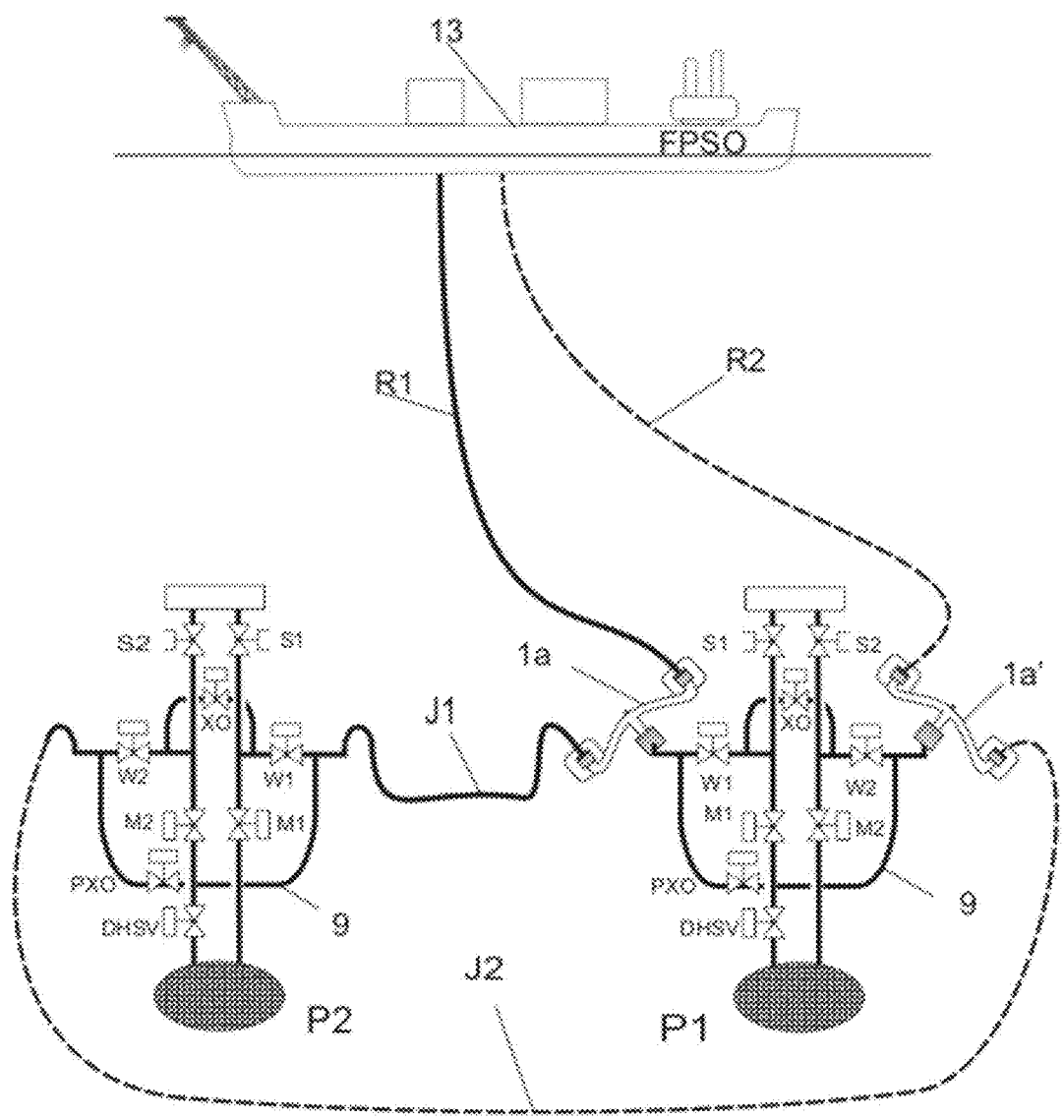
FIG. 4 shows a schematic view of two wells sharing the same production and annular risers by means of two devices according to this invention, connected to the PAB of one of the wells.

FIG. 4 shows a schematic view of an application of the device of this invention in a layout of wells. As can be seen, two wells P1, P2 share the same production and annular risers R1, R2 through two devices 1a, 1a' connected to the WCT/PAB 9 of the well P1.

Figure 5:
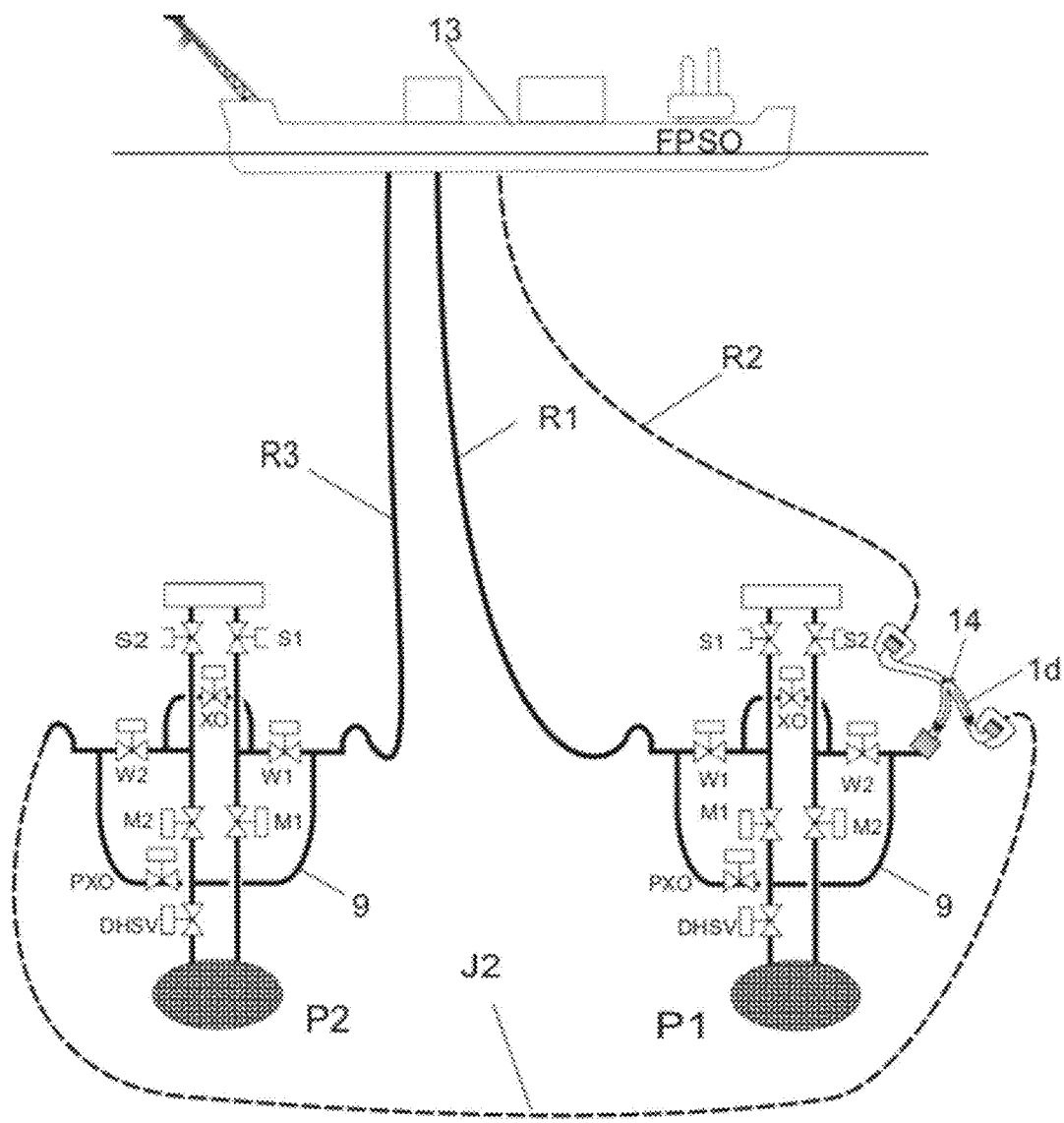
FIG. 5 shows a schematic view of a layout with two producing wells sharing the same annular riser, and with independent production risers.

FIG. 5 shows a layout with two producing wells P1, P2 sharing the same annular riser R2, and with independent production risers R1, R3. This layout uses a mandrel multiplier 1d with an integrated pig diverter 14. The pig sent through the annular riser R2 from the production unit 13, may return through the riser R1 or R3, according to the position of the pig diverter 14.

As can be seen in the embodiments described above, the mandrel multiplying device of this invention may be installed on subsea equipment located at the bottom of the sea, or on equipment still at the surface prior to installation. In principle, the adapter may be installed on any subsea equipment, for example: SPS, PAB, manifold, etc.

Additionally, the mandrel multiplying device of this invention is adapted to allow both horizontal and vertical subsea connections.

Thus the invention enables a more flexible subsea layout that facilitates anticipation of corrections in the drainage system with the addition of new wells, with the objective of obtaining an optimized production curve in relation to the capacity and processing limits of oil and liquid from the SPU.

Additionally, the use of an extra mandrel in subsea equipment such as PAB and SPS, enables and facilitates the addition of new wells without having to definitively abandon an existing well, which might produce again in the future. The possibility of sharing risers significantly reduces the Capex and Opex of a subsea production system.

The integration of a seismic 4D system with a flexible subsea layout, with pairs of wells sharing a single riser is one alternative for anticipating and improving the distribution of oil produced along the production curve. Projects to revitalize mature subsea fields may benefit from the option of having an extra mandrel, according to this invention, which facilitates the connection of more wells, existing and new, interconnected to a production unit.

The projection and existence of extra mandrels on subsea equipment also enables the connection of new wells to run long-duration tests on new discoveries in areas adjacent to existing production units (long tie backs).

The extra mandrel, when available, may also be used in well intervention operations, such as: acidification, hydrate mitigation, etc. Therefore, there are countless technical advantages with the mandrel multiplying device of this invention.

Numerous variations to the scope of protection of this application are allowed. Thus, the fact that this invention is not limited to the specific configurations/implementations described above is reinforced.

The invention claimed is:

1. A mandrel multiplying device for subsea oil production equipment, wherein the device comprises:
a connector for removably coupling with one mandrel of a subsea equipment device;
at least two mandrels to provide connection points between the subsea equipment device and subsea pipes interconnected to other subsea equipment or to a production unit; and
a conduit connecting the connector and the at least two mandrels,
wherein a first portion of the conduit is disposed substantially horizontal between the at least two mandrels, and
wherein when the connector is coupled with the one mandrel of the subsea equipment device, the at least two mandrels of the mandrel multiplying device replace the one mandrel of the subsea equipment device thereby increasing a number of connection points associated with the subsea equipment device.

2. The device of claim 1, further comprising:
at least one interface for a maneuvering and installation tool.

3. The device of claim 2, further comprising:
a guide funnel positioned around each mandrel.

4. The device of claim 2, wherein the device allows a pig to pass within the conduit between at least two of the connection points.

5. The device of claim 1, further comprising:
a guide funnel positioned around each mandrel.

6. The device of claim 5, wherein the device allows a pig to pass within the conduit between at least two of the connection points.

7. The device of claim 1, wherein the device allows a pig to pass within the conduit between at least two of the connector and the at least two mandrels.

8. The device of claim 7, wherein the device allows a pig to pass within the conduit between a first mandrel of the at least two mandrels and the connector and also between a second mandrel of the at least two mandrels and the connector.

9. The device of claim 7, wherein the device allows a pig to pass within the conduit between a first mandrel of the at least two mandrels and a second mandrel.

10. The device of claim 7, wherein the device allows a pig to pass within the conduit between a first mandrel of the at least two mandrels and a second mandrel of the at least two mandrels, and also between the connector and the second mandrel.

11. The device of claim 7, wherein the device allows a pig to pass within the conduit between a first mandrel of the at least two mandrels and a second mandrel of the at least two mandrels, and also between the first mandrel of the at least two mandrels and the connector.

12. The device of claim 11, further comprising:
at least one pig diverter to pre-select the passage of the pig between the first mandrel and the second mandrel, or between the first mandrel and the connector.

13. The device of claim 1,
wherein a second portion of the conduit extends vertically from the first portion of the conduit, and
wherein the second portion is connected to the connector.

14. The device of claim 1, wherein each of the at least two mandrels are additional interconnection points of the subsea equipment.

15. The device of claim 1, wherein the connector is coupled with the one mandrel of the subsea equipment device after the subsea equipment device is installed and operational.

16. A mandrel multiplying device for a subsea oil production equipment, wherein the device comprises:
a connector for coupling with a subsea equipment mandrel;
at least two mandrels to provide connection points with subsea pipes interconnected to other subsea equipment or to a production unit; and
a conduit connecting the connector and the at least two mandrels,
wherein a first portion of the conduit is disposed substantially horizontal between the at least two mandrels, and
wherein the mandrel multiplying device allows a pig to pass within the conduit between a first mandrel of the at least two mandrels and the connector, between a second mandrel of the at least two mandrels and the connector, and also between a third mandrel of the at least two mandrels and the connector.

* * * * *